Feb. 10. 1925.
F. X. LAUTERBUR
FLOUR ELEVATOR
Filed May.1, 1922
1,525,506
3 Sheets-Sheet 3
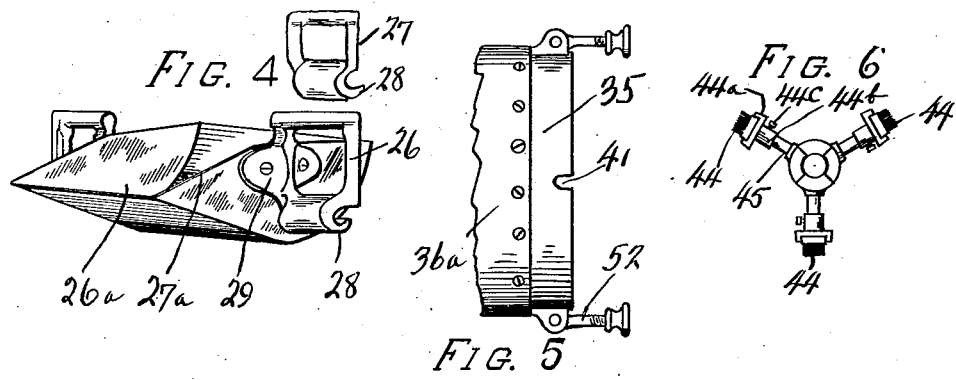
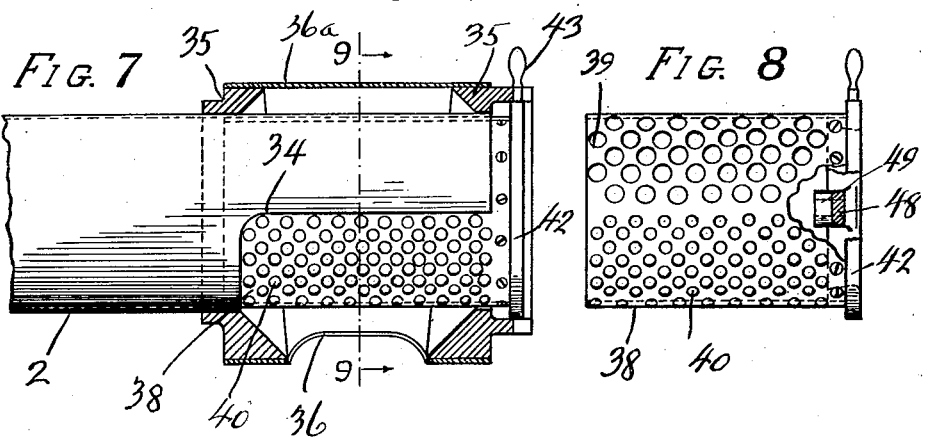
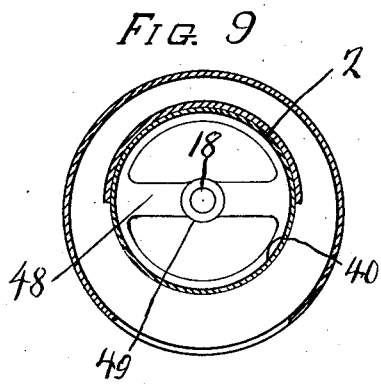 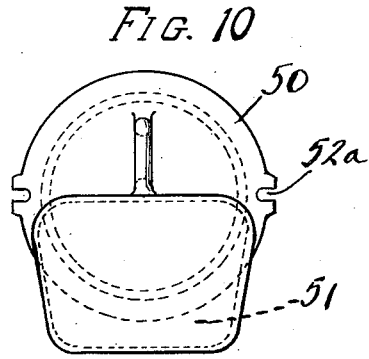
INVENTOR.
FRANK X. LAUTERBUR,
BY Allen & Allen
HIS ATTORNEYS.

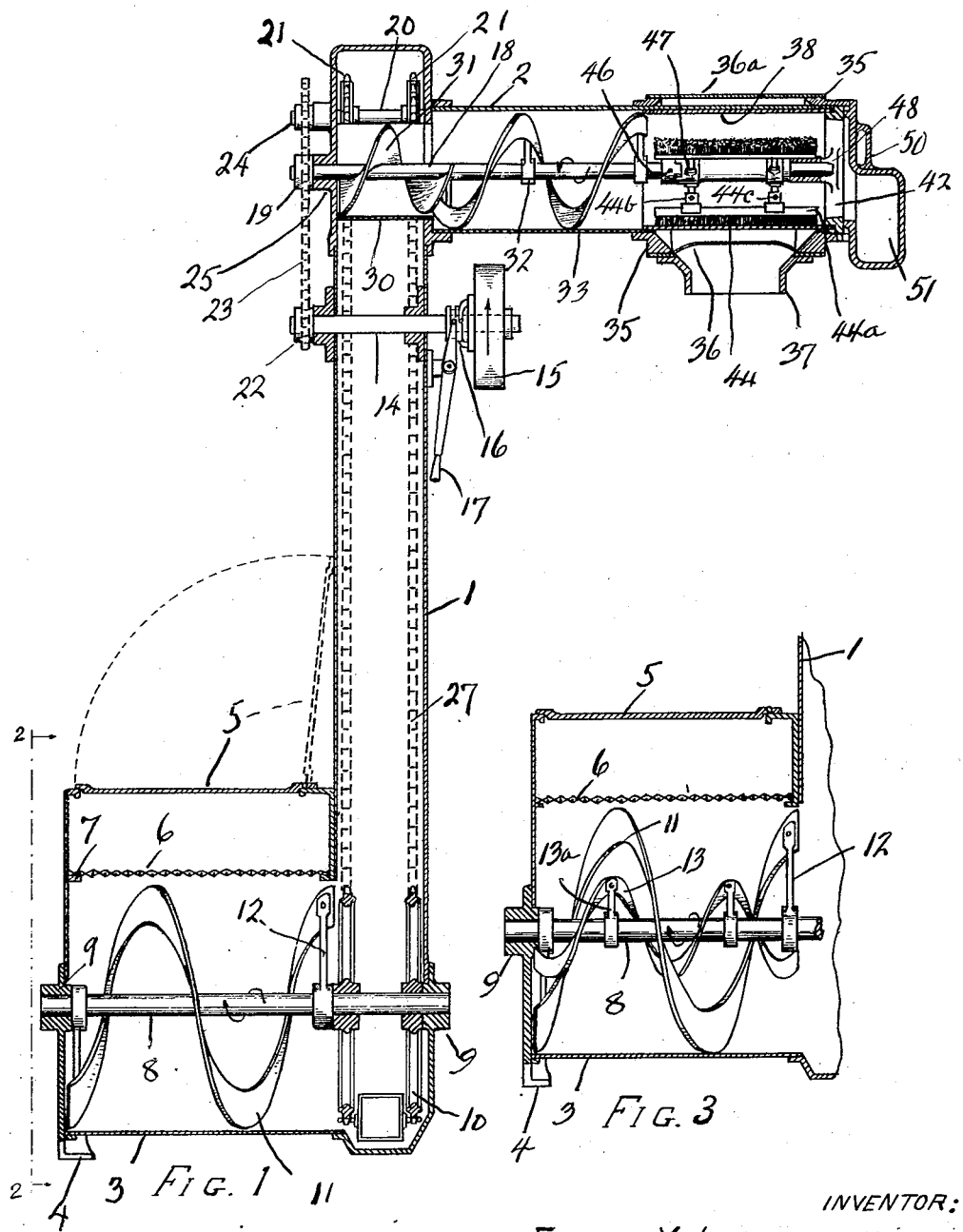

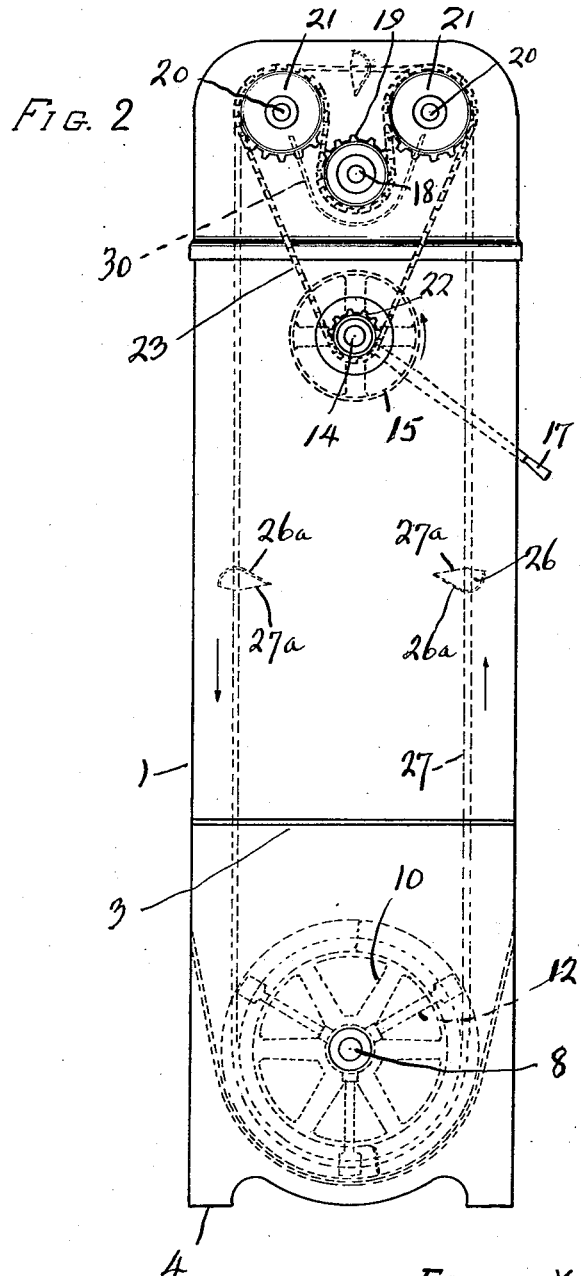

Patented Feb. 10, 1925.

1,525,506

UNITED STATES PATENT OFFICE

FRANK X. LAUTERBUR, OF SIDNEY, OHIO.

FLOUR ELEVATOR.

Application filed May 1, 1922. Serial No. 557,627.

*To all whom it may concern:*

Be it known that I, FRANK X. LAUTERBUR, a citizen of the United States, and a resident of Sidney, in the county of Shelby and State of Ohio, have invented certain new and useful Improvements in Flour Elevators, of which the following is a full, clear, and exact description, reference being had to the accompanying drawings, forming part of this specification.

My invention relates to flour elevators and sifters, such as are used in bakeries for sifting flour into a mixer in mixing a batch of dough.

In devices of this character a mechanism is desired which can be located alongside of a power mixer and will carry the flour from a bin to an elevated point and there sift and aerate it and deliver it through a spout to the bowl of a mixer.

The feeding of flour mechanically is always a difficult proposition, since atmospheric changes, variations in grades of the material, and its fine bolted condition, result in a product which will become clogged, can be mashed together and the finely powdered condition or "life" upset. The sifting operation on flour is primarily intended to deliver the flour in a fine, aerated powder to the point of mixing it with liquids, to avoid any lumpy condition, wherefore the mechanical handling of the flour in a power elevator and sifter becomes of necessity a delicate matter.

It is the object to provide a combined bin, elevator and sifter, which will at all times preserve the flour in perfect condition and will give a uniform feed without getting it lumpy.

In the sifter screen I provide a simple mechanism whereby the mesh of the foraminations can be changed and in connection with the brush used internally of the screen, I provide a quick, detachable mounting means, which is a great convenience. I also arrange the brushes so that they are adjustable.

It is my object to make the whole sifter unit very simple and readily demountable in structure, and in this way I provide for considerable saving in time and work to the baker.

In the conveyor portions of my device it is my object to feed the flour through suitable casings or pipes by means of a spiral device, which does not press or mash the flour, as would the ordinary worm.

In the elevator, it is my object to obtain a uniform feed and to avoid the necessity of limiting the shape and size of the chain buckets, because of a centrifugal tendency acting against the buckets at their dumping point. Thus I cause the bucket chain at the upper end of the machine to traverse a horizontal path when riding over the conveyor that feeds the flour of the sifter element.

These various objects and other advantages to be noted I accomplish by that certain construction and arrangement of parts to be hereinafter more specifically pointed out and claimed.

In the drawings,

Figure 1 is a central vertical section taken through the device.

Figure 2 is an end elevation of the device taken from the end away from the sifter.

Figure 3 is a detail side elevation of a modified form of bin and conveyor, the casing thereof being broken away to show the internal mechanism.

Figure 4 is a perspective view of a portion of the bucket chain, showing one bucket mounted in connection therewith.

Figure 5 is a detail side elevation of the end of the sifter cylinder.

Figure 6 is a detail end elevation of the adjustable brush holder.

Figure 7 is a side elevation of the sifter screen and cylinder with the retaining rings and outer casing in section.

Figure 8 is a side elevation of the screen partly broken away.

Figure 9 is a section on the line 9—9 of Figure 7.

Figure 10 is an end elevation of the closing plate.

The machine is formed with a casing having an upright, usually rectangular, hollow column 1, which has extending therefrom at a right angle at the upper end, a cylindrical member 2. At the base of the casing 1, it opens into a bin 3, the bin and portion 1 having suitable feet 4 for resting on the floor. (Supporting casters may be used in said feet.)

The bin has a hinged lid 5, which is swung open as shown, to charge with flour, and a screen 6, laid on suitable angle iron supports 7, acts as a preliminary separator of the flour, but more particularly as a safeguard.

A shaft 8 is supported in the bin and the standard 1 in suitable journals 9, said shaft carrying a pair of large sprockets 10, 10, for the bucket chain. This shaft has also mounted thereon a spiral ribbon 11, held rigidly with the shaft by arms 12.

This ribbon extends substantially to the sides of the space within the bin defined by the screen 6, and extends from the outer end of the bin to a point adjacent the nearest sprocket 10.

In Figure 3, I have also shown an additional member, comprising a smaller ribbon 13 mounted by short arms 13ª on the shaft 8 and acting in the opposite direction to the ribbon. Thus when the shaft is operated, the ribbon engages the mass of the flour in the bin and feeds it toward the sprockets in the vertical column portion of the casing, and the small inner ribbon resists this line of feed, thereby preserving the flour in a loosely agitated or aerated condition. The ribbon feeds the flour without jamming it and forcing it into aggregated masses. As intimated above, I find that a feeding worm will often get slightly clogged, whereupon the flour will get into a solid mass and be forced along in such a mass by the worm, becoming more and more solid as the feeding progresses.

Adjacent the upper end of the vertical standards, but below the member 2, a shaft 14 is journaled in the standard, and has its ends extending at both sides thereof. On one side is mounted a loose pulley 15 and a clutch 16, which is controlled by a handle 17 to connect the pulley with the shaft or disconnect it, as desired. A driving belt (not shown), from the mixer shaft or from countershafting, is used to drive the pulley, which is the power element of the entire device.

At the upper end of the standard is a conveyor shaft 18, which carries an external sprocket 19. There are also two shafts 20 located above the shaft 18, each carrying a pair of sprockets 21 within the standard. The power shaft 14 has a sprocket thereon, as at 22, and a chain 23 is connected to this sprocket and to the external sprockets 24 on the shafts 20.

The upper conveyor shaft 18 has a journal in a boss 25 located below the shafts 20 and the chain drives this shaft 18 by means of the sprocket 19, said chain being given a turn around this sprocket as shown in Figure 2.

The bucket chain is formed in two elements, made up of links 26 and 27. The links hook into each other by means of the bent-over portions 28 and the links 26 have transversely extending lugs, 29, to which the buckets are secured, said buckets extending across between the two chains and connecting them together.

The buckets, as shown, are formed as small troughs 26ª having tapering sides 27ª and will hold considerable flour without spilling it out when the bases of the buckets are horizontal.

The large sprockets 10, 10, in the lower end of the standard, engage the two chains and by means of the chains, the sprockets and the lower conveyor shaft are revolved.

The elevator as so constructed operates as follows. The buckets pass around the lower sprockets 10 in a clockwise direction, thereby picking up a load of flour that has been fed to the space occupied by the sprockets 10 by means of the conveyor ribbon 11. They then pass upwardly with their bases lowermost and substantially horizontal, until they reach the upper sprockets 21, where the chains traverse a horizontal path, with the buckets turned with their bases vertical.

During this horizontal movement of the buckets, there is no centrifugal motion tending to keep the flour in the buckets and it will all fall out into a semi-cylindrical plate 30 lying below the shaft 18 and closing the standard so that the flour does not fall back into the lower portions thereof.

The buckets then return down through the column where they pick up another load of the material.

The upper conveyor is formed by means of a short worm section 31 formed on the shaft 18, which terminates preferably within the standard itself. The shaft carries by means of arms 32 thereon, a spiral ribbon 33, which is of a dimension to come to the inner periphery of the cylinder 2. Thus as the shaft 18 is driven, the worm portion clears the space beneath the buckets and the ribbon then feeds the flour without clogging and with an agitating action toward the sifter brushes and screen.

I prefer to use the cylinder as the support for the sifter mechanism, and thus I cut away the lower half or at least a considerable portion of the lower half of the cylinder from a point where the ribbon terminates to the end of the sifter mechanism, as indicated at 34. Over the cylinder I place and secure two cast rings 35, one of which embraces the cylinder at the outer end and the other embraces it just before the cutaway portion begins.

The rings carry the cylindrical outer cover 36ª of the sifter, which cover has at its lower end an opening 36 (preferably oval), about which opening is secured a spout casting 37.

The shifter screen 38 is formed in cylindrical shape and has the large holes or foraminations 39 for one portion of its body and smaller holes 40 for the remaining portion thereof. These graded opening zones can be varied to give more than two styles of opening, if desired.

In mounting the screen cylinder it is thrust into the cut-away end of the cylinder 2. The outer ring 35 has slots 41 formed therein, and the screen cylinder has an outer head ring 42 formed with a radially extending pin or handle 43, which fits into said slots. Thus when the screen cylinder is inserted in place, the handle is arranged in the desired slot 41, which holds the screen in adjusted position. The position is varied by pulling the screen slightly out and revolving it a half turn and thrusting the handle into the other slot when setting the ring back in place.

The brush device is formed of a series of adjustable brushes 44, carried by spiders 45, which are held together by the brushes. The spiders slide on the shaft 18 and a notched collar 46 is mounted on the shaft, so as to engage with the hub 47 of the inner spider when the brush mechanism has been thrust into place. This coller also holds the brush mechanism as an inner abutment. The brushes have casings 44$^a$ and interspaced socket pieces 44$^b$, which slide on the ends of the spider arms and are held adjustable by screws 44$^c$.

The head 42 of the screen cylinder is formed with a cross member 48, which mounts the boss 49, same being the journal for the outer end of the shaft 18. This boss also bears against the hub of the outer spider of the brush mechanism, and holds it in place against the driving collar 46.

A cover plate 50 is mounted over the head 42 on the outside, this cover plate being formed with a dirt trap 51. A pair of hinge bolts 52 engaging notches 52$^a$ are used to fasten on this cover plate, since it must be frequently removed to discard the dirt, hairs, large particles, and the like, which will not go through the screen, and hence pass out into the trap. The plate is thus clamped to the outer face of the cast ring 35 and bears against the head 42 of the screen, said head being largely open.

As so constructed the sifter is assembled as follows. First the brush spiders are set over the shaft 18 and the brush moved to driving position. The screen is then inserted into the cylinder 2 with its head 42 arranged so that its boss slides over the shaft 18 and comes up against the outer brush spider.

The head is also arranged, at this time, so that the desired screen foraminations are lowermost, and the cover plate is then mounted so as to hold the cylinder and brushes in place.

The action of the conveyor is to feed flour in good condition to the sifter. In the sifter, the brushes dash the flour about and brush it through the holes or foraminations in the lower part of the screen. The presence of the cylinder 2 about the upper portions of the screen prevents flour from being flung out through the undesired portion of the screen, thereby insuring a uniform sifted flour in a fluffy, aerated condition.

By removing the cover plate, all the inner parts may be inspected, and furthermore they will slide out without manipulation of any further screws or bolts.

I am not aware of any person in the past having produced a feeding device for flour in a sifter which employs a spiral ribbon, thereby protecting the flour during its movement without unnecessary churning, and at the same time without "balling" the flour up during the feed.

In the elevation of the flour I obtain a uniform feed without execessive speed and application of power. Also in the bin I avoid excessive churning of the flour and excessive jamming also, although where desired I impart a slight churning action by the additional worm.

I have not attempted to describe alternative mechanism in the above specification, but merely one type of machine embodying the principles of my invention, which principles I will now express in the claims that follow.

Having thus described my invention, what I claim as new and desired to secure by Letters Patent, is:—

In a flour elevator, the combination of a vertical casing having a flour receiving bin in the base thereof, and a conveyor device at the upper end thereof, an endless carrier formed of a series of buckets, means for pivotally linking the buckets together at their ends, means for driving said carrier, and including a pair of rotary members located above and at each side of the conveyor, and a rotary element at the bin, a driver for the pair of rotary elments, a shaft for the conveyor, and a flexible member passing around the driver, and the pair of rotary elements, and the conveyor shaft, thereby driving said elements and the shaft.

FRANK X. LAUTERBUR.